Figure 1:
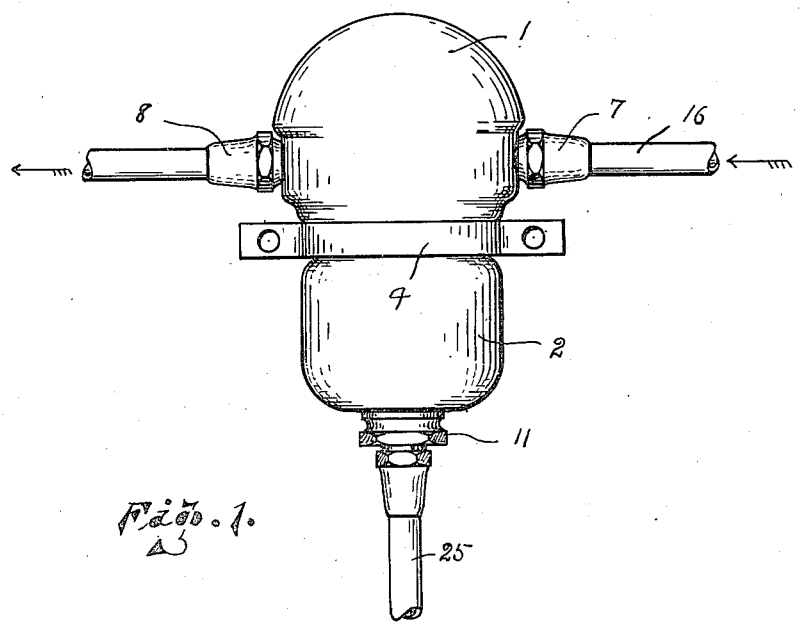

June 8, 1948.  G. C. MOSHER  2,442,857

SYNCHRONIZING VALVE

Filed June 22, 1944

INVENTOR.
BY Grover C. Mosher.
Geo. Stevens.
Atty.

Patented June 8, 1948

2,442,857

UNITED STATES PATENT OFFICE 2,442,857

SYNCHRONIZING VALVE

Grover C. Mosher, Duluth, Minn.

Application June 22, 1944, Serial No. 541,499

1 Claim. (Cl. 137—153)

This invention relates to a novel synchronizing valve for the automatic control of the gas supply to an internal combustion engine in respect to the passage of the lubricating oil supply of said engine.

I am aware that control means for this general purpose are old in the art, and in which various forms of mechanically operated means have been resorted to as well as the automatic intake of air to the engine gas supply for such control.

However, one of the principal objects of the instant invention is simplicity and the direct action of the fluid control means in positively shutting off the gas supply to the engine when the oil pressure is below a predetermined pressure and without the introduction of air into the gas supply line.

Other objects and advantages may appear in the further description of the invention.

Figures 2, 3:
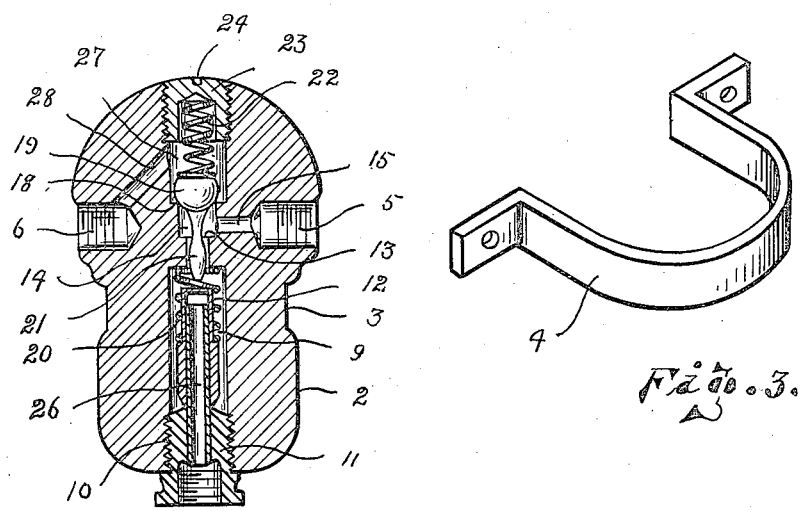

Referring to the accompanying drawing forming part of this application and in which like reference characters indicate like parts:

Fig. 1 is a front elevation of one of said valves with the three necessary pipe connections thereto, Fig. 2 is a central vertical sectional view with the portion of the pipe connections omitted and Fig. 3 is a perspective view of a simple form of a single bracket for convenient support of the valve.

In the drawing, 1 represents the substantially semispherical upper terminus of the unitary body portion of the valve housing. 2 represents the somewhat egg-shaped lower portion of said housing and 3 is the central cylindrical waist portion intermediate of said end portions, the latter being so designed for the convenient reception of a single U shaped unitary holding member 4 for attachment at the side of the engine adjacent the intake manifold thereof, not shown.

5 and 6 represent suitable internally threaded sockets upon opposite sides of the head 1 of the valve for the gas intake connection 8 upon one side and the engine carburetor connection 7 upon the opposite side of said valve head.

Centrally of the lowermost body portion 2 and axially thereof, is a bore or chamber 9 terminating at its lowermost extremity in a slightly enlarged and internally threaded portion 10 for the reception of the hollow elongated cylindrical plug 11.

The upper end of the plug 11 is reduced and externally screw-threaded to fit into the threaded socket 10 of the body of the valve.

The elongated hollow cylindrical portion 26 of the plug 11 is open throughout, but is normally closed at its upper end by the telescopically mounted elongated and reciprocal cap 12.

This cylindrical cap is of greater outside diameter through its lower half than through its upper half thus forming a stepped annular shoulder for support of the expansive helical spring 20 which surrounds same and abuts at its opposite end against the upper end of the bore or chamber 9.

Upwardly from this bore or chamber 9 is a smaller through channel or stepped bore 13 into the enlarged chamber 14 which has the radially extending port 15 leading into the socket 5 and communicating with the gas connecting pipe 16 to the engine, not shown.

The upper end of the enlargement 14 forms an annular seat 18 for the ball valve 19 provided with the depending stem 21 which is reciprocable within the restriction or smallest portion 13 of the bore and is intermittently engaged by the upper end of the cap 12.

The upper arcuate surface of the ball valve 19 is constantly impinged by the expansive helical spring 22 the opposite end of which is seated within the suitably chambered externally screw-threaded plug 23 and which plug is provided with a suitable external diametrically disposed slot 24 for convenient screw driver adjustment.

It is to be noted that the lowermost external extremity of the plug 11 is enlarged and may be knurled or conveniently shaped for application of a wrench for adjustment of same and into which enlargement of said plug 11 is installed the connection 25 from the crank case or oil chamber of the engine.

Both this plug 11 and the plug 23, being screw-threadedly mounted in the body of the valve and each controlling its respective expansive spring, provide ample means for accurate adjustment of the valve so as to function properly under various circumstances.

Thus when oil in the crank case of the engine has reached that certain predetermined pressure desired, the ball valve 19 will be raised from its seat 18 by the engagement of the telescopic cap-like member 12 engaging the lower end of the stem 21 of the said valve and lifting same to permit flow of fluid through the valve to the engine it being apparent that an inclined uninterrupted passageway 28 exists intermediate the intake socket 6 and chamber 27 and in which latter the ball valve 19 functions, then should the oil pressure for any reason decrease below that predetermined critical pressure required, the cooperative functioning of the two springs 20 and 22 will immediately shut off the supply of fuel passing through the valve and thus prevent further operation of the engine which will obviously avoid damage due to the lack of lubrication being under proper pressure.

From the foregoing it is apparent that I have devised a simple and dependable means for automatic shut off respecting the gas supply to an engine and one most conveniently adjusted to accommodate different circumstances as well as for cleaning and removal of parts when necessary.

Having thus described one practical embodiment of the invention, what I claim is:

A synchronizing valve for control of gas flow therethrough comprising an integral body portion having an axially disposed stepped through bore, said bore forming an upper chamber, a lower chamber and an intermediate smallest chamber, a ball valve within said upper chamber, means biasing said ball toward closed position and said ball having an elongated depending stem extending through said intermediate chamber and into said lowermost chamber, a removable closure plug for the lower end of said lowermost chamber and having an open-ended elongated hollow pipe-like stem extending upwardly into said latter chamber, an outer lubricant pressure connection in said plug leading into said plug extension, a reciprocable cap telescopically surrounding said extension and normally engageable with said depending valve stem, means biasing said cap toward closed position in respect to the upper open end of said hollow stem extension of said closure plug and away from contact with said ball valve stem whereby when lubricant pressure in said plug falls below a predetermined amount the gas communication through said valve will be relatively governed.

GROVER C. MOSHER.

REFERENCES CITED

The following references are of record in the file of this patent:

UNITED STATES PATENTS

| Number | Name | Date |
|---|---|---|
| 711,846 | Gossard | Oct. 21, 1902 |
| 1,339,798 | Thompson | May 11, 1920 |
| 1,473,303 | Lightford | Nov. 6, 1923 |
| 1,485,497 | Emerson | Mar. 4, 1924 |
| 1,576,889 | Wulf | Mar. 16, 1926 |
| 1,903,248 | Spence | Mar. 28, 1933 |
| 2,171,240 | Hinsch | Aug. 29, 1939 |